United States Patent [19]

Haselmaier, Sr.

[11] Patent Number: 5,339,678
[45] Date of Patent: Aug. 23, 1994

[54] TEST APPARATUS FOR SEAL MEMBERS IN A PRESSURIZED OXYGEN ENVIRONMENT

[75] Inventor: L. Haynes Haselmaier, Sr., Picayune, Miss.

[73] Assignee: Johnson Service Company, Milwaukee, Wis.

[21] Appl. No.: 10,117

[22] Filed: Jan. 28, 1993

[51] Int. Cl.$^5$ .............................................. G01M 3/02
[52] U.S. Cl. .......................................... 73/49.8; 73/37
[58] Field of Search ........................... 73/37, 46, 49.8; 138/89

[56] References Cited

U.S. PATENT DOCUMENTS

| | | |
|---|---|---|
| 3,213,674 | 10/1965 | Salcido et al. |
| 3,400,572 | 9/1968 | Mizenko . |
| 3,835,878 | 9/1974 | Braidt et al. ........................ 73/46 |
| 3,987,663 | 10/1976 | Repella ............................... 73/46 |
| 4,407,171 | 10/1983 | Hasha et al. ...................... 73/49.8 |
| 4,903,529 | 2/1990 | Hodge . |
| 5,000,033 | 3/1991 | Turner et al. . |

OTHER PUBLICATIONS

"Standard Test Method for Determining Ignition Sensitivity of Materials to Mechanical Impact in Pressurized Oxygen Environments" ASTM Test Method G86 Sep. 1989 pp. 1-11.

Primary Examiner—Hezron E. Williams
Attorney, Agent, or Firm—Joseph E. Root, III; E. L. Levine

[57] ABSTRACT

An apparatus for testing seal members for use in an oxygen-rich environment. The test apparatus operates and is constructed to replicate the service environment as closely as possible. The test unit includes a hull with an interior test portion, with connections for gaseous or liquid oxygen and nitrogen and having a reciprocating actuator shaft extending into the hull interior. A valve seal member is carried on a retainer and bears against sealing surfaces on a nozzle to test valve sealing operations, while a dynamic O-ring bears against a liner element carried within the hull. Pressure sensors determine whether an effective seal is maintained, while a temperature sensor insures that the dynamic O-ring temperature does not exceed specifications. The retainer and the nozzle can be changed to permit testing a variety of valve seals.

20 Claims, 5 Drawing Sheets

TEST APPARATUS FOR SEAL MEMBERS IN A PRESSURIZED OXYGEN ENVIRONMENT

BACKGROUND OF THE INVENTION

The present invention relates generally to the field of test apparatus, and more particularly to the field of test apparatus for sealing devices.

High pressure oxygen environments are inherently dangerous. Events that normally bring only mild consequences can assume catastrophic proportions, because the high pressure and attendant high temperatures can easily induce combustion, and the enriched oxygen environment rapidly turns combustion into catastrophe. That is exactly the case with seal members used in liquid oxygen (LOX) or pressurized gaseous oxygen (GOX) systems. At normal pressures, or in atmospheric air, failure of a seal member may lead to system shutdown, but that is generally all. The same event in a LOX or GOX system, however, can lead to destruction of the entire system, as failure causes the seal to ignite, which in turn sparks a combustion chain that includes the entire pump or other apparatus.

A major difficulty in designing equipment for LOX or GOX service is that current test procedures simply do not indicate whether a given seal element will adequately perform in a given system. The standard test for determining the suitability of a seal member in LOX or GOX service is ASTM Test Method G 86, published by the American Society for Testing and Materials, 1916 Race Street, Philadelphia, Pa. 19103, entitled "Standard Test Method for Determining Ignition Sensitivity of Materials to Mechanical Impact in Pressurized Oxygen Environments." This test subjects a test item to a mechanical impact with a striker pin dropped from a predetermined height, within a chamber in which a LOX or GOX atmosphere has been introduced.

That test method, however, has little relation to the actual loads experienced by a seal member in service. It is immediately apparent, moreover, that this test has nothing whatsoever to do with the ability of a seal member to perform its primary function—sealing. The test only addresses the response of a material to a single impact. In service, however, a valve seal member experiences not one but many impacts, often at high cyclic rates. Other seals, such as O-rings, never experience impact loading but rather are subject to friction loads that can abrade material and cause its temperature to rise.

Also completely ignored by this test method are adiabatic compression effects. Within a high-pressure, relatively low-volume environment such as a LOX or GOX system, the pressure waves that result from ordinary actions such as shutting a valve can have disastrous effects, because the increased pressure causes an adiabatic temperature rise in the fluid, and because the compression wave propagates rapidly through the system, the temperature rise is effectively instantaneous. In a 10,000 psi system, for example, such a pressure wave can produce a temperature of 1000° F. in the medium surrounding a seal member. This sort of thermal load is significantly different from anything revealed by the ASTM test, and can cause seals that seemed perfectly suitable to fail. Several catastrophic system failures have been traced to this phenomenon.

The art has so far been unable to devise an effective, acceptable test procedure for seal members. For example, U.S. Pat. No. 5,000,033, issued to Turner on Mar. 19, 1991 and entitled "O-ring Gasket Test Fixture" does address the problem of testing O-rings, but it does not look to the special problems of a LOX/GOX environment. Thus, there is no attempt to replicate actual service conditions; a standard test fixture is deemed sufficient for all tested items. Also, no provision is made for monitoring temperature changes of the material during use, a primary failure mode for O-rings in LOX/GOX service. And, of course, there is no provision whatsoever for testing any seal members other than O-rings. Other disclosures of seal testing apparatus and methods simply fail to grapple with the particular problems of LOX/GOX systems. These references include U.S. Pat. Nos. 4,903,529, (Hodge, Feb. 27, 1990, entitled "Valve System Analyzer"); 3,400,572 (Mizenko, Sep. 10, 1968, entitled "Seal Evaluation Test Fixture"); and 3,213,674 (Salcido, Oct. 26, 1965, entitled "Tool").

The primary result of this failure has been increased development time and cost, because cost effective seal materials consistently fail the ASTM G 86 test procedure at elevated pressures. It has been observed, for example, that tests performed on standard materials that are known to perform in actual applications at pressures up to 10,000 psi do not pass the existing test, owing to the differences in load characteristics. Faced with such a situation, engineers must either select a different seal material or seek an exception to the test procedure. If the latter course is chosen, the available alternative materials are more expensive by at least an order of magnitude, so that a seal that should cost in the range of about $5 costs about $50. Needless to say, the total cost of such an increase, when spread over an entire system, is considerable. Even so, however, situations exist in which no existing material can pass the ASTM test, despite the fact that engineers know that certain readily available seals will perform perfectly adequately. Thus, time, effort and money must be invested in justifying an exception to the test procedure, which drives up development cost and stretches out development time.

A need exists for a simple, straightforward method for testing seal members in a fashion that can yield dependable results. That goal is achieved in the present invention.

SUMMARY OF THE INVENTION

The broad goal of the present invention is to provide an apparatus that can reliably test seal members for service in oxygen-rich environments.

Another object of the invention is to provide an apparatus that can test both valve seal members and O-rings in an environment that replicates a service application.

Yet another object of the invention is to provide an apparatus that can replace existing test apparatus for items designed for use in oxygen-rich environments.

These and other objects are achieved in the present invention of a test apparatus for a seal member used in a selected sealing application in an oxygen-rich environment, which includes the following elements. A hull, generally cylindrical in form, has a longitudinally extending interior portion formed therein, with a fluid inlet for providing a supply of oxygen-rich fluid at a selected elevated pressure to the interior portion of the hull. An actuator means provides a source of reciprocal linear motion to the hull, including an actuator shaft extending into the interior portion of the hull. A seal member testing portion is located in the interior portion of the hull and includes seal member carrying means for carrying a seal member on the actuator shaft, the seal member carrying means being adapted to provide the seal member with a selected retaining method, degree of encapsulation and sealing surface, designed to replicate the selected sealing application. A first monitoring means determines whether the sealing member forms an effective seal with the sealing surface, and a second monitoring means determines whether any harmful interaction occurs between the seal member and the oxygen-rich environment.

A preferred embodiment of the invention is able to test a valve seal member and an O-ring simultaneously, and it includes the following elements. A hull, generally cylindrical in form, has a longitudinally extending interior portion formed therein. Attached thereto is a fluid inlet means, which includes an oxygen supply means for providing a supply of gaseous oxygen at a selected elevated pressure to the interior portion of the hull; nitrogen supply means for providing a supply of gaseous nitrogen at a selected elevated pressure to the interior portion of the hull; and selection means for switching between the oxygen supply means and the nitrogen supply means. An actuator shaft means is adapted for reciprocating linear movement and extends into the interior portion of the hull. An accumulator means is in fluid communication with the interior portion of the hull for varying the amount of fluid available to absorb compression waves propagated therein.

Testing is accomplished using a seal member testing means for testing valve seals and O-rings, located in the interior portion of the hull means. This system includes a valve seal testing portion, which itself includes valve seal retainer means for carrying the valve seal, the retainer means being removably mounted for reciprocal linear motion on the actuator shaft; nozzle means for interacting with the valve seal, including an inlet port in fluid communication with the fluid inlet means; and valve seal sealing surface means adapted to make sealing contact with the valve seal. The valve seal means and the nozzle means are adapted to provide the valve seal with a selected retaining method, degree of encapsulation and sealing angles, according to the selected application. Valve seal leakage monitoring means determine whether the interaction between the valve seal and the valve seal sealing surface means forms an effective seal.

An O-ring testing portion includes O-ring retainer means for carrying the O-ring on the actuator shaft and O-ring sealing surface means for bearing against the O-ring according to the selected application. O-ring leakage monitoring means determine whether the interaction between the O-ring and the O-ring sealing surface means forms an effective seal, and O-ring temperature monitoring means determine whether the O-ring is within temperature limits of the selected application. Test control means cause the actuator shaft means to move reciprocally between a closed position, wherein the valve seal is pressed against the valve seal sealing surface means at a selected pressure, and an open position, wherein the valve seal is positioned a selected distance from the valve seal sealing surface, the movement being accomplished at a selected rate according to the selected application.

DETAILED DESCRIPTION OF A PREFERRED EMBODIMENT

This invention deals with seals, particularly seals used in an oxygen-rich environment. The invention applies to all types of sealing means, but those most generally involved in the preferred embodiment are formed of elastomeric materials, in one of two general configurations. One type has a generally circular form and is carried in a groove or gland; that type seal is generically referred to herein as an "O-ring". Another common seal is often found in a valve mechanism, in which a generally disc-shaped seal member is carried on a valve stem and is moved into sealing engagement with the sealing surfaces of a valve seat. This type seal is generically referred to herein as a "valve seal." It should be noted that the invention is not limited to the named types of seal members, which are shown for illustrative purposes only.

Figure 1:
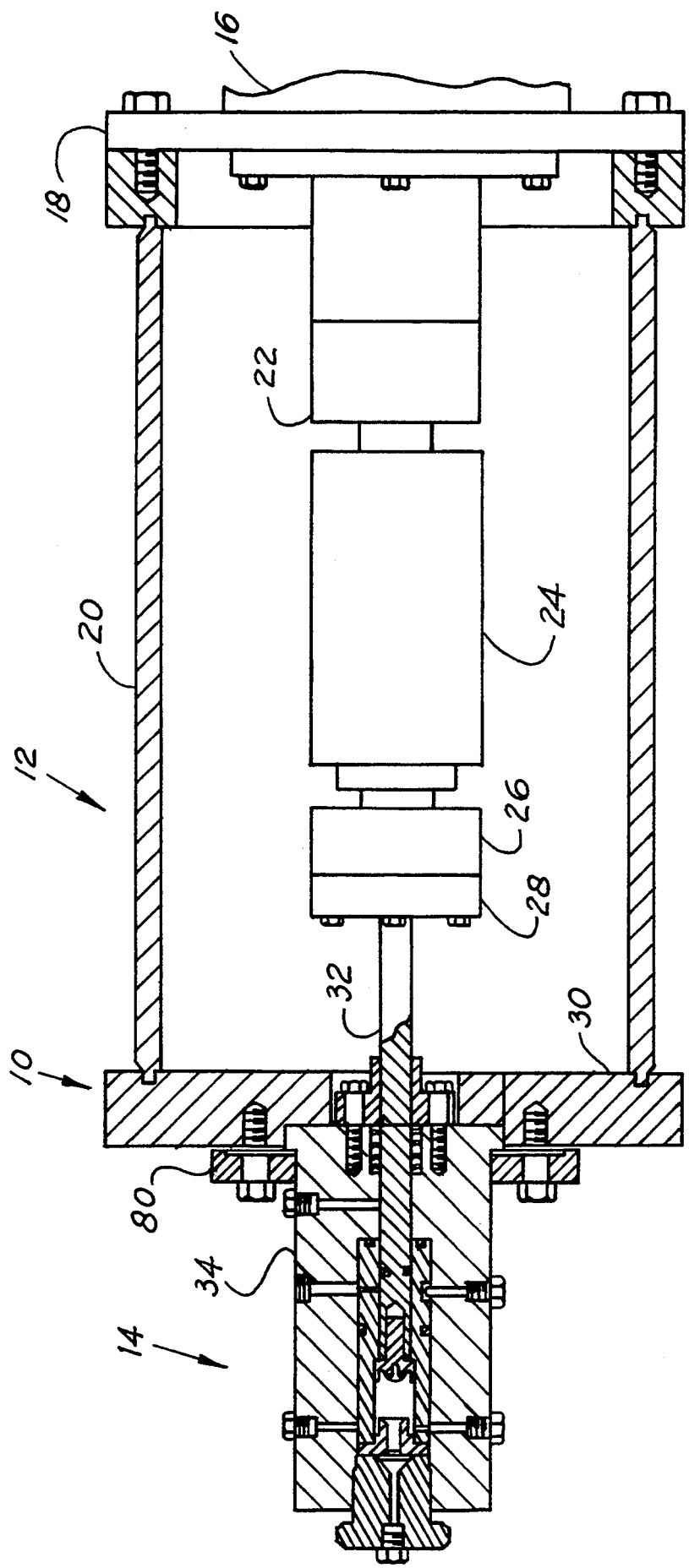
FIG. 1 is a side view of the hardware portion of an embodiment of the present invention, partially cut away to show internal components thereof.

A seal configuration test unit 10 according to the present invention is shown in FIG. 1. Generally, the complete seal configuration test unit can be visualized as two modules, the actuator interface module 12 and the tester module 14 (best seen in FIG. 2), which are interfaced with their associated electronics to form the system shown schematically in FIGS. 4 and 5. The test module is designed to replicate the seal operating environment, including retaining means, sealing surfaces, and the like, as well as providing for the introduction of fluids at appropriate pressures and temperatures. Sensors for monitoring the appropriate system variables (normally, pressure and temperature at relevant points) are also provided. This module replicates the operating environment of the seal under test, and therefore specific design details will vary accordingly.

The actuator interface module operates as a source of reciprocal linear motion, delivered to the tester input shaft 32. The motion is generated by an actuator 16, which may be driven electrically or hydraulically, as described below. Preferably, power is provided by an electric linear actuator. Between the actuator shaft 22 and the tester input shaft 32 are located a spring cushing assembly 24, a load cell adaptor 26 and a load cell 28. All of these elements are well known and generally available to the art, and for the embodiment depicted the load cell is preferably rated at 0–5000 pounds force. Structurally, an actuator front mounting flange 18 is secured to the actuator housing itself, and spacer assembly 20 is threadedly attached thereto. The spacer assembly preferably consists of four rods with threads formed in each end, but alternate configurations can be used, employing either different numbers of rods, or using a solid body structure (formed, for example, from a section of pipe material). Test module flange 30 is attached to the spacer assembly by convenient means, such as threads.

As noted above, the test module 14 can assume a number of configurations, based on the seal under test. A typical embodiment shown here (best seen in FIG. 2) is designed to accommodate a variety of valve seals and dynamic O-rings. The general requirements for the test module are an enclosure, such as hull 34, designed to contain the high pressures involved; fixturing means for holding the seal under test and providing sealing surfaces, such as seat retainer 68 and nozzle 72; and an interface to an appropriate fluid supply, such as bushing 74. It has been found advantageous to provide a liner 50 within the hull, to replicate the test environment. All of these elements should be fabricated from the same materials that will be used in the service environment, to the extent possible.

The hull is preferably a cylindrical unit, formed from a strong, corrosion-resistant material such as stainless steel SS-304. A projecting mounting shoulder 35 projects radially outward from the aft end of the hull, and a pressure well 36 extends axially into the hull for a depth preferably just over half its length, with threads formed adjacent the hull face. Input aperture 38 extends axially from the bottom of the pressure well to the aft end of the hull.

A liner 50 is dimensioned to fit into the pressure well, with its length being less than the depth of the unthreaded portion of the well. A seal between the liner and the pressure well can be established by O-rings 52, as is understood by those of skill in the art. An axial bore extends the length of the liner, including a liner input bore 56, in registration with and having the same inner diameter as the hull input aperture, and a pressure test bore 58 having an inner diameter greater than that of the liner input bore. The liner should be formed from a material having excellent strength, combustion resistance, lubricity, and the ability to maintain a good surface finish. It will generally be necessary to select a liner material that is different from that used for the shaft 32 to avoid galling. Preferred liner materials are, for example, Monel K500 and A464 Naval Brass.

Nozzle 70 fits into the pressure well atop the liner, extending into the liner test bore. Nozzle flange 71 extends outward to the pressure well and lies against the end of the liner. A step 73 is formed in the nozzle, so that a portion of the nozzle has an outer diameter approximately equal to the test bore inner diameter, while the portion of the nozzle below the step has a smaller diameter. The nozzle is preferably dimensioned so that it does not extend into the threaded portion of the pressure well. Nozzle passage 72 extends axially the length of the nozzle.

A threaded inlet bushing 74 is screwed into the pressure well, bearing against the nozzle (and thence the liner). An O-ring 77 can be provided in an appropriate gland at the inner end of the bushing, and the outer end may be formed to assist tightening, preferably in a hexagonal pattern. The thread pattern used for the bushing and pressure well, in combination with the O-rings 52 and 77, should be chosen to provide adequate sealing strength at design loads, which in the embodiment shown are 10,000 psig. Fitting 75 provides a connection to a source of high pressure test gas, which in the illustrated case is either high pressure gaseous oxygen (GOX) or gaseous nitrogen (GN2), as explained more fully below. As used herein, the term "high pressure test gas" shall be understood to refer to either GOX or GN2.

The input shaft 32 extends into the tester module through the hull input aperture 38 and input bore 56, and further extends into pressure test bore 58. The sliding engagement between the shaft and the liner is important, and it is preferred that the shaft be fabricated from a stainless steel, such as 316L or 304L, and that the surface be maintained at about 8 RMS. A dynamic O-ring test carrier 60 is provided on the shaft, located such that the shaft reciprocal movement of the shaft will transport the test O-ring between end points lying within the liner.

For testing a valve seat, a seat retainer 62 is attached to the end of the input shaft, preferably by threads, as shown. A seat hood 64 extends outward to slidingly engage the wall of the pressure test bore, with a seat cavity 67 formed therein. The valve seat 66 to be tested is carried within the seat cavity, secured by appropriate means such as screw 68.

It should be noted that the nozzle 70 and seat retainer 62 are adapted to test a particular valve seat design. The variables that must be taken into account in testing a selected valve seat design include the size and shape of the seat, the retaining method employed, and the degree of encapsulation and sealing angles used to effect a seal. In order to subject a valve seat to exactly the stresses encountered in service, the designer should provide a nozzle that duplicates the sealing environment in which the seat will be used. The illustrated embodiment shows one such nozzle/retainer combination, in which a circular seat is carried on a raised boss, and sealing is effected by contact with angled sealing surfaces 79. It should be clear that testing a variety of valve seat designs can be accomplished simply by changing the seat retainer and nozzle (as well as making software changes discussed below). In this manner, a small hardware inventory allows for testing a wide range of valve seats, with only minimal setup required to change seats.

This device thus provides realistic service testing for two different sealing systems, replicating the pressure, temperature, abrasion and impact loads encountered in actual service. For testing valve seats, a valve seat 66 is mounted on valve seat retainer 62 and urged against nozzle sealing surface 79 as the actuator shaft moves to its closed position, as high pressure test gas is supplied through inlet 75, passages 76 and 72. Any leakage around the seat will be seen in the test zone 69 defined by the liner inner wall, the nozzle body and the retainer seat hood 64. To detect any such leakage, seat monitoring ports 59 are formed in the liner, in registration with hull pressure ports 42. It is preferred to provide four such ports, which number can be varied by those in the art according to particular needs. As discussed below, pressure in these ports is monitored to measure the effectiveness of a valve seat seal.

A second sealing system to be tested is that of dynamic O-ring 60, carried within O-ring gland 61 formed in the actuator shaft. Here the situation is somewhat complicated by the fact that a major problem with dynamic O-rings is failure from heat buildup, caused by friction during service. Thus, it is important to monitor the temperature of the O-ring. Direct monitoring would be difficult, but a useful measure of O-ring temperature can be obtained from the temperature of the liner material adjacent the O-ring, by providing a liner thermocouple port 55, in registration with hull thermocouple port 44.

As will be appreciated by those in the art, it is critical that the liner port be machined to leave only a small amount of liner material between the end of the port and the liner wall, to provide an accurate temperature reading, but enough material should be left to retain mechanical stability. The amount of material remaining below the thermocouple port will depend on the particular liner alloy and heat conditioning, as well as the method of forming the port in the liner (e.g., drilled with a 60 degree drill point, or bored with an end mill, etc.). As will be appreciated by those in the art, a sufficient thickness of material should remain to contain the maximum pressure pulse that is expected within the module, taking into consideration the cyclic pressurization and temperature excursions. These safety factors are balanced against the fact that reducing the wall thickness improves the accuracy of the thermocouple reading. In the embodiment shown here, the port was drilled with a conventional twist drill, leaving a minimum thickness of 0.036 inches.

The thermocouple port should be centered on the anticipated axial path of the test O-ring, and an appropriate thermocouple unit positioned therein to monitor any temperature changes in the O-ring. Pressure leakage around the test O-ring will be seen abaft the O-ring, and may be sensed at O-ring pressure monitor port 46, formed in the hull and extending through to the shaft aperture.

Clearly, the liner must be positioned in careful alignment with the hull, to insure registration of the various monitor ports. To maintain that position, a set screw 40 extends from the hull outer surface into a slot 54 formed at an appropriate position on the liner surface. Thus, the liner can be inserted into the proper position in the hull with the set screw in place, and then the inlet bushing can be tightened without altering the position of the liner.

Appropriate packing material, such as chevron seals 82, is provided where the shaft enters the hull body, secured by backing plate 84. For dynamic O-ring testing it might be desired to substitute a seal such as those sold by the Furon Company under the trademark OMNISEAL, as would be apparent to those of skill in the art. The tester module may be joined to flange 30 by means known to the art. A convenient and preferred design, as shown, features a shoulder 35 formed in the aft end of the hull body 34, fitting into a recess in the yoke flange 30 and held in place by cleat ring 80, appropriately secured by bolts or the like.

Figure 4:
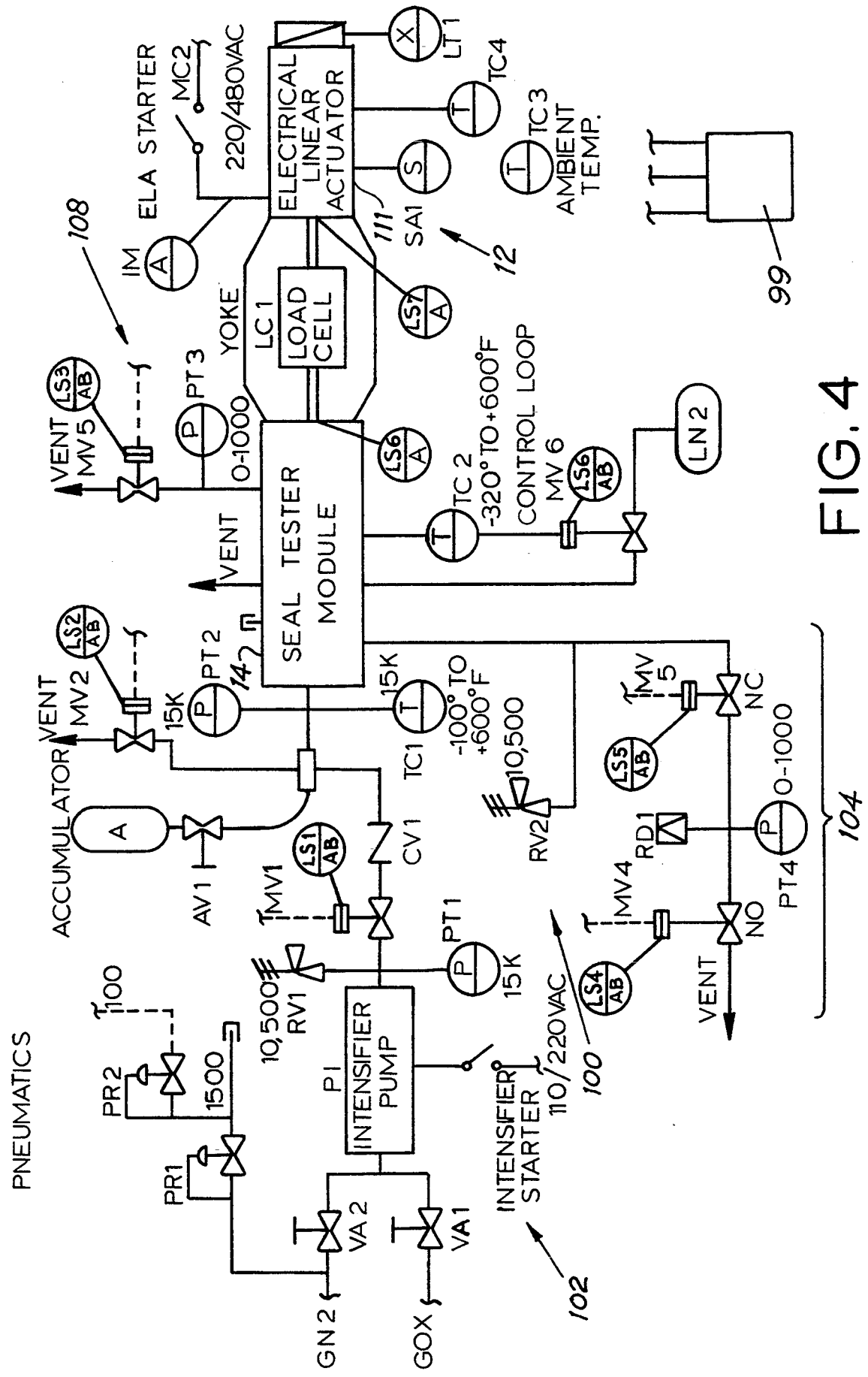
FIG. 4 is a schematic representation of a preferred embodiment of the present invention.

In operation, the seal configuration test unit 10 is connected as part of a seal test system 100, as shown schematically in FIG. 4. The sensors and similar elements shown connected to the seal configuration test unit are conventional, and will be readily understood by those in the art, based on FIG. 4 and the following discussion. Control of the test regime is provided by digital computer 99, operating commercially-available software, to control the overall system. A Macintosh personal computer, running LabView 2 software, has been found entirely adequate for this purpose.

An input system supplies high pressure test gas to the tester module. Valves VA1 and VA2 cooperatively select either the GOX or GN2 source, and the appropriate gas is boosted to the selected test pressure at an intensifier pump P1. Safety features will be understood by those in the art, including a relief valve RV1 and check valve CV1. As indicated in the schematic, the illustrated system is designed for a maximum pressure of about 10,000 psi, with relief valves rated at 10,500 psi, but other pressures (higher or lower, as required) could well be used.

An accumulator A is provided between the check valve and the tester inlet to assist in testing adiabatic effects. With the accumulator valve AV1 closed, adiabatic compression effects are maximized, as a compression wave acts only on the small volume of gas within the test module. Opening the valve AV1 moderates adiabatic compression, providing higher volumes of gas to absorb any compression wave.

Figure 2:
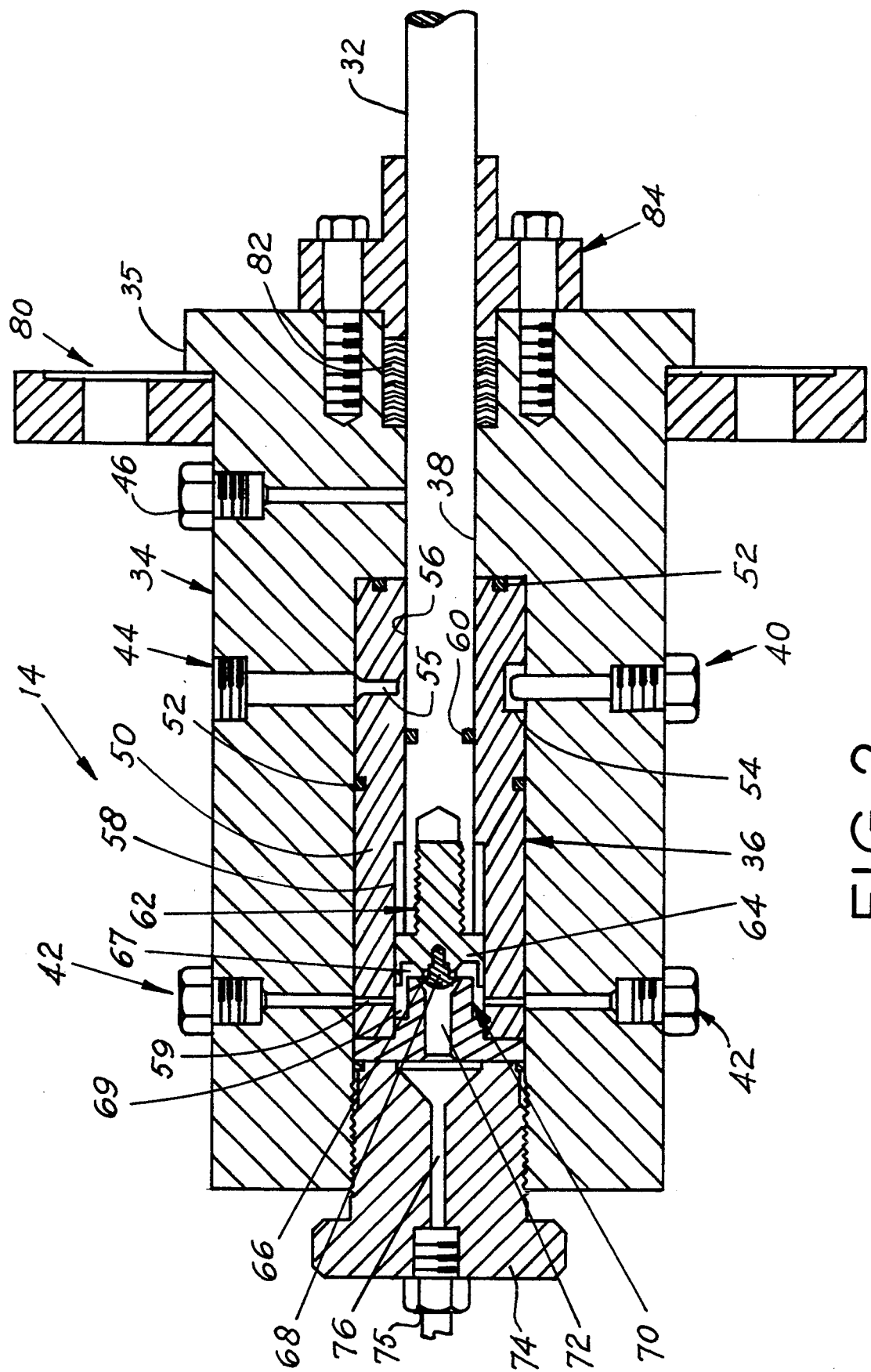
FIG. 2 is a vertical sectional view of the tester module of the embodiment depicted in FIG. 1.
Figure 3:
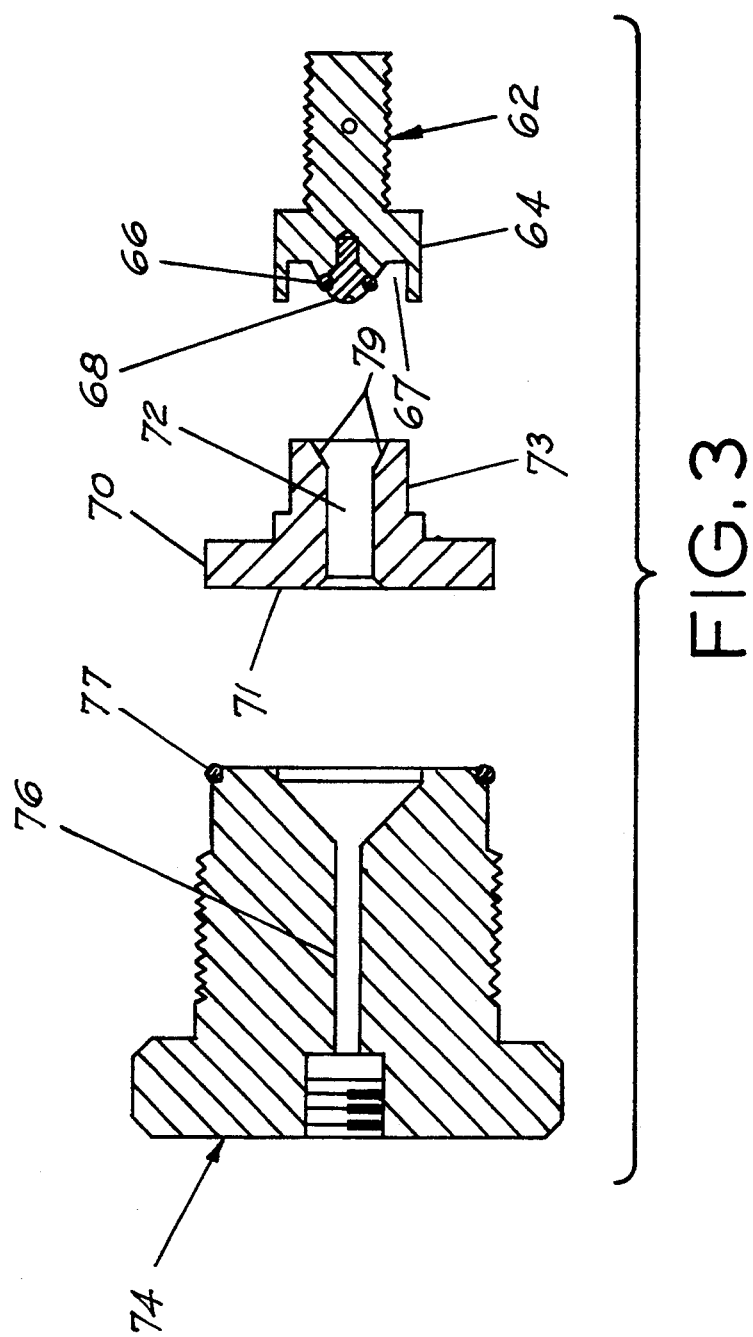
FIG. 3 is an exploded detail sectional view of portions of the tester module shown in FIG. 2.

Valve seat testing, using hull pressure ports 42 (FIG. 2), is monitored through pressure test subsystem 104. Pressure transducer 104, in conjunction with conventional components such as appropriate valves (MV4 and MV5), provides signals that indicate the pressure within test zone 69 (FIG. 2). Multiple transducers, positioned respectively in each pressure port 42, are employed, arranged and coordinated as known in the art. Similarly, the dynamic O-ring temperature is monitored through temperature control subsystem 106, and the pressure abaft the O-ring is monitored at O-ring pressure monitor subsystem 108. Because of the potential danger presented by temperature overages, the temperature control subsystem includes a control loop that can vent the system before ignition temperatures are reached.

The system shown in FIG. 4 can be programmed to conduct test regimes that duplicate actual service conditions. The computer controls the introduction of GOX or GN2, the operation of the actuator shaft between its open and closed positions, and monitors the test results. For example, the control computer can select a valve cycle time and valve seal impact force (determined by the electrical linear actuator cyclic rate and shaft velocity), and a gas pressure. The system can then proceed to perform the indicated test for a selected number of cycles, monitoring to insure that results remain within safe levels and recording the test results. Those in the art will be capable of setting up such test regimes, as well as configuring the system to monitor appropriate auxiliary variables, such as input gas pressure and temperature (via pressure and temperature transducers PT2 and TC1), ambient temperature (temperature transducer TC3) and the like.

An important point here is the ability to perform all testing with GN2 before testing with GOX. GN2 is, of course, an inert medium when compared with GOX, and high pressure testing can be conducted at a preliminary level without incurring the risk of ignition that would accompany failure in GOX service. Thus, testing is generally performed twice—once in a GN2 environment, and then (assuming success on the first round) in GOX.

Figure 5:
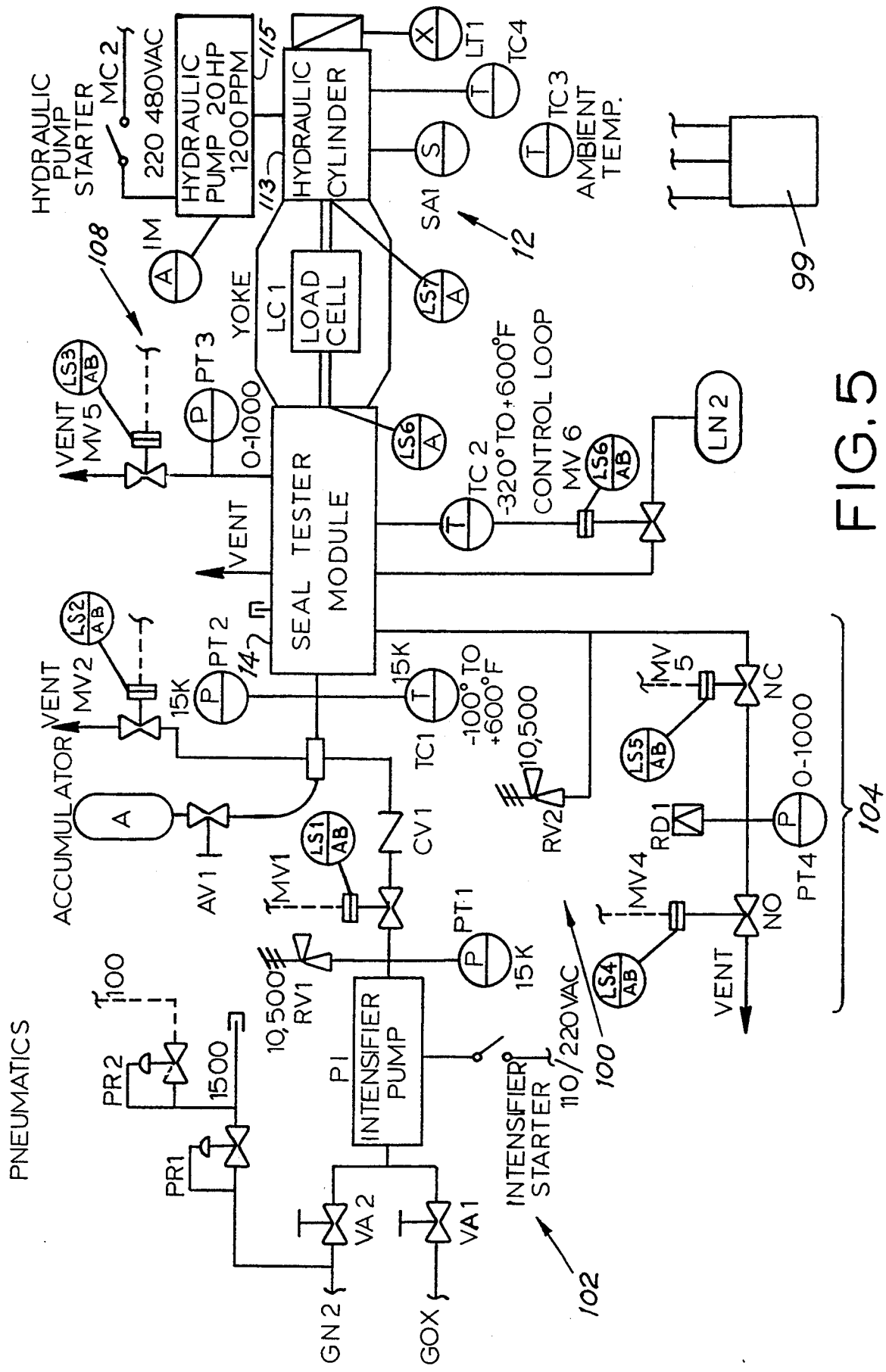
FIG. 5 is a schematic representation of an alternate embodiment of the present invention.

FIG. 4 depicts the preferred embodiment, in which the actuator is powered by electric linear actuator 111. Alternatively, as seen in FIG. 5, the actuator interface module could also be powered by a hydraulic cylinder 113, driven by hydraulic pump 115. The electric actuator is preferred because it avoids the problems of contamination of test surfaces with hydraulic fluid, and the attendant ignition hazards.

Another important point is the ability to configure a test unit specifically to a particular application. The illustrated embodiment depicts a system that tests both an O-ring and a valve seal. Other embodiments could be set up to test only O-rings, using the O-ring test portion of the system (O-ring gland 61 on the actuator shaft (FIG. 2), together with the pressure and temperature monitoring subsystems 108 and 106, respectively (FIG. 4)). Similarly, another embodiment could test only valve seal members, using the valve seal test portion of the unit (retainer 62, nozzle 70 and associated components shown in FIG. 2, together with the valve seal pressure monitoring system 104).

Likewise, the present invention could also operate in a LOX environment as well as GOX, with no loss in effectiveness.

It will be understood by those in the art that the present invention may be modified in a number of aspects without departing from the spirit of the invention. For example, separate units could be constructed to test valve seals and O-rings. Also, the materials can be altered as needed for the particular application. Neither these nor other changes, however, will affect the scope of the invention, which shall be defined solely by the claims appended hereto.

I claim:

1. A test apparatus for a seal member used in a selected sealing application in an oxygen-rich environment, comprising:

a hull, generally cylindrical in form, having a longitudinally extending interior portion formed therein;

fluid inlet means for providing a supply of oxygen-rich fluid at a selected elevated pressure to the interior portion of said hull;

actuator means for providing a source of reciprocal linear motion to said hull, including an actuator shaft extending into said interior portion of said hull;

a seal member testing portion, located in said interior portion of said hull and including seal member carrying means for carrying a seal member on said actuator shaft, said seal member carrying means being adapted to provide said seal member with a selected retaining method, degree of encapsulation and sealing surface, designed to replicate the selected sealing application;

first monitoring means for determining whether the sealing member forms an effective seal with said sealing surface; and second monitoring means, for determining whether any harmful interaction occurs between the seal member and the oxygen-rich environment.

2. The test apparatus of claim 1, wherein the seal member is a valve seal, and wherein said seal member testing portion includes valve seal retainer means for carrying said valve seal, said retainer means being mounted for reciprocal linear motion on said actuator shaft;

nozzle means for interacting with said valve seal, including an inlet port in fluid communication with said fluid inlet means; and valve seal sealing surface means adapted to make sealing contact with said valve seal; said valve seal and said nozzle means being adapted to provide said valve seal with a selected retaining method, degree of encapsulation and sealing angles, according to said selected application; and valve seal leakage monitoring means for determining whether said contact between said valve seal and said valve seal sealing surface means forms an effective seal.

3. The test apparatus of claim 2, wherein said seal member testing portion includes valve seal test control means for causing said actuator means to move said actuator shaft reciprocally between a closed position, wherein said valve seal is pressed against said valve seal sealing surface means at a selected pressure, and an open position, wherein said valve seal is positioned a selected distance from said valve seal sealing surface means, said movement being accomplished at a selected rate according to the selected application.

4. The test apparatus of claim 1, wherein the seal member is an O-ring, and wherein said seal member testing portion includes O-ring retainer means for carrying said O-ring, formed on said actuator shaft;

O-ring sealing surface means for bearing against said O-ring according to said selected application;

O-ring leakage monitoring means for determining whether said interaction between said O-ring and said O-ring sealing surface means forms an effective seal; and O-ring temperature monitoring means for determining whether said O-ring is within temperature limits of said selected application.

5. The test apparatus of claim 4, wherein said seal member testing portion includes O-ring test control means for causing said actuator means to move said actuator shaft reciprocally between first and second positions, at a selected rate, concurrently monitoring the outputs of said O-ring leakage monitoring means and said O-ring temperature monitoring means according to the selected application.

6. The test apparatus of claim 1, wherein said fluid inlet means includes oxygen supply means for providing a supply of oxygen-rich fluid at a selected elevated pressure to said interior portion of said hull;

inert fluid supply means for providing a supply of inert fluid at a selected elevated pressure to said interior portion of said hull;

selection means for switching between said oxygen supply means and said inert fluid supply means.

7. The test apparatus of claim 6, wherein said oxygen-rich fluid is gaseous oxygen and said inert fluid is liquid nitrogen.

8. The test apparatus of claim 1, wherein said oxygen-rich fluid is gaseous oxygen.

9. The test apparatus of claim 1, wherein said oxygen-rich fluid is liquid oxygen.

10. The test apparatus of claim 1, wherein said valve seal retainer means is removably mounted on said actuator shaft.

11. The test apparatus of claim 1, further comprising accumulator means in fluid communication with said interior portion of said hull for varying the amount of fluid available to absorb compression waves propagated therein.

12. A test apparatus for testing seal members for use in a selected sealing application in pressurized oxygen service, comprising:

a hull, generally cylindrical in form, having a longitudinally extending interior portion formed therein;

fluid inlet means for providing a supply of oxygen-rich fluid at a selected elevated pressure to said interior portion of said hull;

actuator means for providing a source of reciprocal linear motion to said hull, including an actuator shaft extending into said interior portion of said hull;

accumulator means in fluid communication with said interior portion of said hull for varying the amount of fluid available to absorb compression waves propagated therein;

seal member testing means for testing valve seals and O-rings, located in said interior portion of said hull and including a valve seal testing portion, including valve seal retainer means for carrying said valve seal, said retainer means being mounted for reciprocal linear motion on said actuator shaft;

nozzle means for interacting with said valve seal, including an inlet port in fluid communication with said fluid inlet means; and valve seal sealing surface means adapted to make sealing contact with said valve seal;

said valve seal retainer means and said nozzle means being adapted to provide said valve seal with a selected retaining method, degree of encapsulation and sealing angles, according to said selected application; and valve seal leakage monitoring means for determining whether said interaction between said valve seal and said valve seal sealing surface means forms an effective seal;

an O-ring testing portion, including

O-ring retainer means for carrying said O-ring, formed on said actuator shaft;

O-ring sealing surface means for bearing against said O-ring according to said selected application;

O-ring leakage monitoring means for determining whether said interaction between said O-ring and said O-ring sealing surface means forms an effective seal; and O-ring temperature monitoring means for determining whether said O-ring is within temperature limits of said selected application.

13. The test apparatus of claim 12, wherein said seal member testing means includes valve seal test control means for causing said actuator means to move said actuator shaft reciprocally between a closed position, wherein said valve seal is pressed against said valve seal sealing surface means at a selected pressure, and an open position, wherein said valve seal is positioned a selected distance from said valve seal sealing surface, said movement being accomplished at a selected rate according to the selected application.

14. The test apparatus of claim 12, wherein said O-ring testing portion includes O-ring test control means for causing said actuator means to move said actuator shaft reciprocally between first and second positions, at a selected rate, concurrently monitoring the outputs of said O-ring leakage monitoring means and said O-ring temperature monitoring means according to the selected application.

15. The test apparatus of claim 12, wherein said fluid inlet means includes oxygen supply means for providing a supply of oxygen-rich fluid at a selected elevated pressure to said interior portion of said hull;

inert fluid supply means for providing a supply of inert fluid at a selected elevated pressure to said interior portion of said hull;

selection means for switching between said oxygen supply means and said inert fluid supply means.

16. The test apparatus of claim 15, wherein said oxygen-rich fluid is gaseous oxygen and said inert fluid is liquid nitrogen.

17. The test apparatus of claim 12, wherein said oxygen-rich fluid is gaseous oxygen.

18. The test apparatus of claim 12, wherein said oxygen-rich fluid is liquid oxygen.

19. The test apparatus of claim 12, wherein said valve seal retainer means is removably mounted on said actuator shaft.

20. A test apparatus for testing seal members for use in a selected sealing application in pressurized gaseous oxygen service, comprising:

a hull, generally cylindrical in form, having a longitudinally extending interior portion formed therein;

fluid inlet means, including oxygen supply means for providing a supply of gaseous oxygen at a selected elevated pressure to said interior portion of said hull;

nitrogen supply means for providing a supply of gaseous nitrogen at a selected elevated pressure to said interior portion of said hull; and selection means for switching between said oxygen supply means and said nitrogen supply means.

actuator shaft means, adapted for reciprocating linear movement and extending into said interior portion of said hull;

accumulator means in fluid communication with said interior portion of said hull for varying the amount of fluid available to absorb compression waves propagated therein;

seal member testing means for testing valve seals and O-rings, located in said interior portion of said hull and including a valve seal testing portion, including valve seal retainer means for carrying said valve seal, said retainer means being removably mounted for reciprocal linear motion on said actuator shaft means;

nozzle means for interacting with said valve seal, including an inlet port in fluid communication with said fluid inlet means; and valve seal sealing surface means adapted to make sealing contact with said valve seal;

said valve seal retainer means and said nozzle means being adapted to provide said valve seal with a selected retaining method, degree of encapsulation and sealing angles, according to said selected application; and valve seal leakage monitoring means for determining whether said interaction between said valve seal and said valve seal sealing surface means forms an effective seal;

an O-ring testing portion, including

O-ring retainer means for carrying said O-ring on said actuator shaft means;

O-ring sealing surface means for bearing against said O-ring according to said selected application;

O-ring leakage monitoring means for determining whether said interaction between said O-ring and said O-ring sealing surface means forms an effective seal; and O-ring temperature monitoring means for determining whether said O-ring is within temperature limits of said selected application; and test control means for causing said actuator shaft means to move reciprocally between a closed position, wherein said valve seal is pressed against said valve seal sealing surface means at a selected pressure, and an open position, wherein said valve seal is positioned a selected distance from said valve seal sealing surface means, said movement being accomplished at a selected rate according to the selected application.

* * * * *